United States Patent [19]
Cipolla et al.

(10) Patent No.: US 6,587,151 B1
(45) Date of Patent: Jul. 1, 2003

(54) VIDEO CAMERA INTEGRATION ON A PORTABLE COMPUTER

(75) Inventors: Thomas Mario Cipolla, Katonah, NY (US); Rama Nand Singh, Bethel, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/140,572

(22) Filed: Aug. 26, 1998

(51) Int. Cl.[7] .......................... H04N 5/225; H04N 5/232
(52) U.S. Cl. ....................... 348/373; 348/552; 348/375; 348/207.1; 348/211.14; D16/202
(58) Field of Search ........................... 348/14.04, 14.07, 348/14.02, 552, 373, 375, 376, 207.1, 211.14; D14/317, 129, 132; D16/202, 208; 361/686

(56) References Cited

U.S. PATENT DOCUMENTS

| 5,546,334 A | | 8/1996 | Hsieh et al. ............ 364/709.11 |
|---|---|---|---|
| D374,433 S | * | 10/1996 | Shima et al. ............... D14/317 |
| 5,748,441 A | * | 5/1998 | Loritz et al. ................. 348/552 |
| 5,801,919 A | * | 9/1998 | Griencewic .................. 348/552 |
| 5,948,086 A | * | 9/1999 | Lin .............................. 361/686 |
| D425,054 S | * | 5/2000 | Hwang et al. ............. D14/317 |
| 6,118,653 A | * | 9/2000 | Kim ............................ 361/686 |
| 6,141,052 A | * | 10/2000 | Fukumitsu et al. ......... 348/373 |
| 6,323,902 B1 | * | 11/2001 | Ishikawa ..................... 348/373 |
| 6,417,884 B1 | * | 7/2002 | Chang et al. ............... 348/373 |
| 2001/0050720 A1 | * | 12/2001 | Karube et al. .............. 348/373 |
| 2002/0024611 A1 | * | 2/2002 | Watanabe et al. ........... 348/373 |

* cited by examiner

*Primary Examiner*—Wendy R. Garber
*Assistant Examiner*—John M. Villecco
(74) *Attorney, Agent, or Firm*—Daniel P. Morris; Alvin J. Riddles

(57) ABSTRACT

On a portable computer, a video camera is integrated as a feature by mounting the camera as an assembly made up of a lens and associated pixel electronics in a camera base that is positioned on the perphery of the display in the cover of the portable computer when the cover is open, and the providing of a cavity in the base portion of the portable computer positioned so that the camera assembly enters the cavity when the cover of the portable computer is closed.

14 Claims, 8 Drawing Sheets

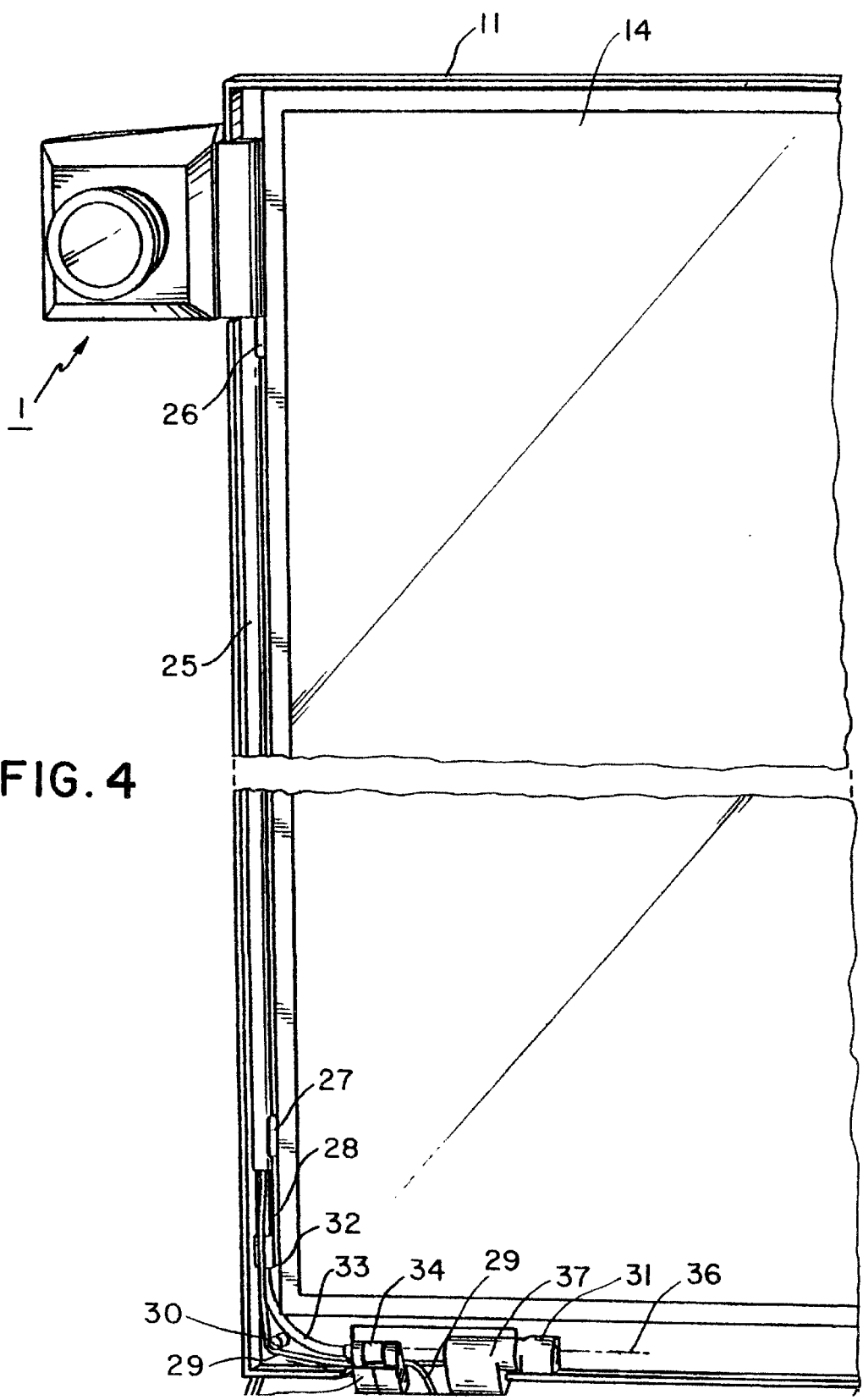

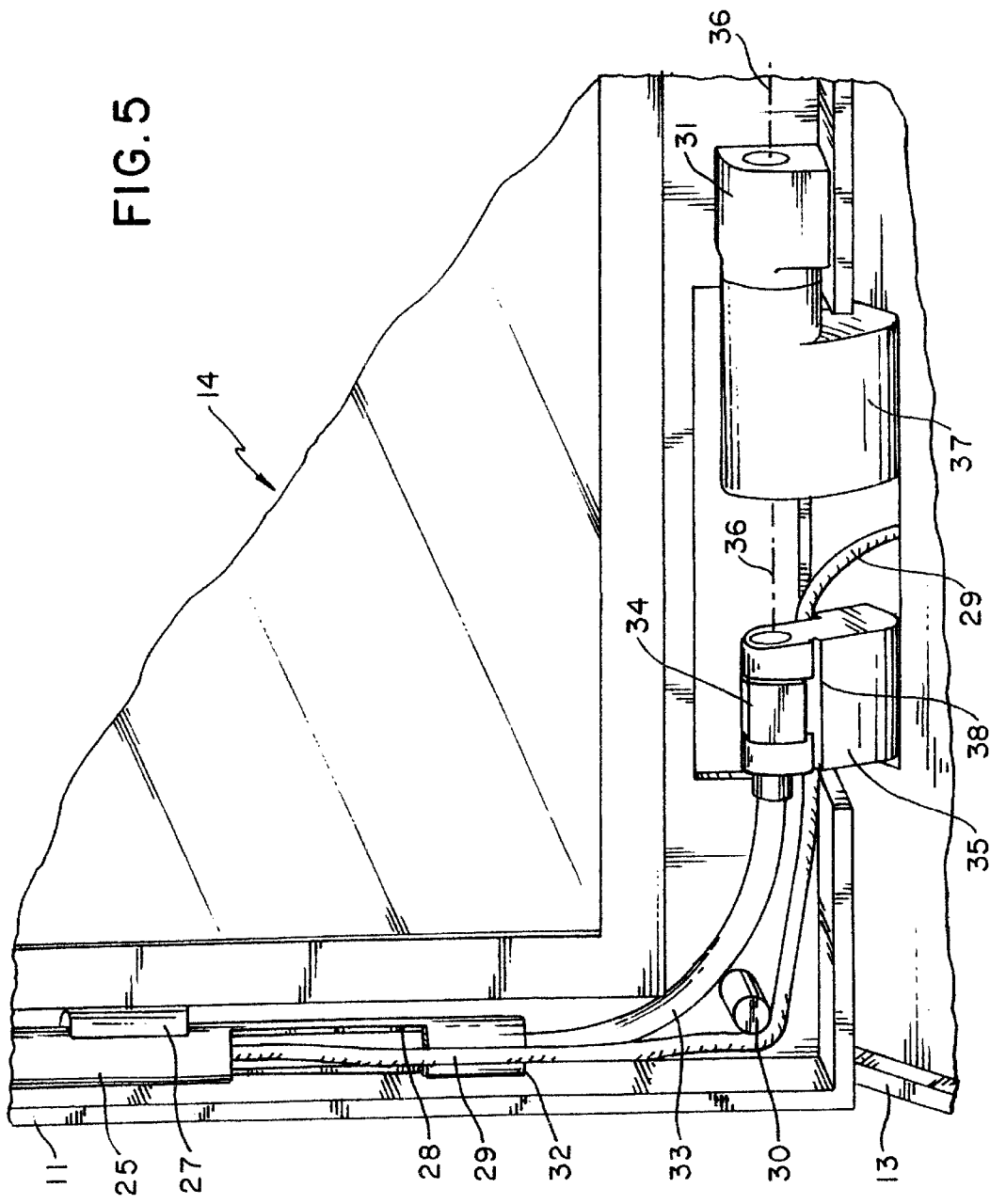

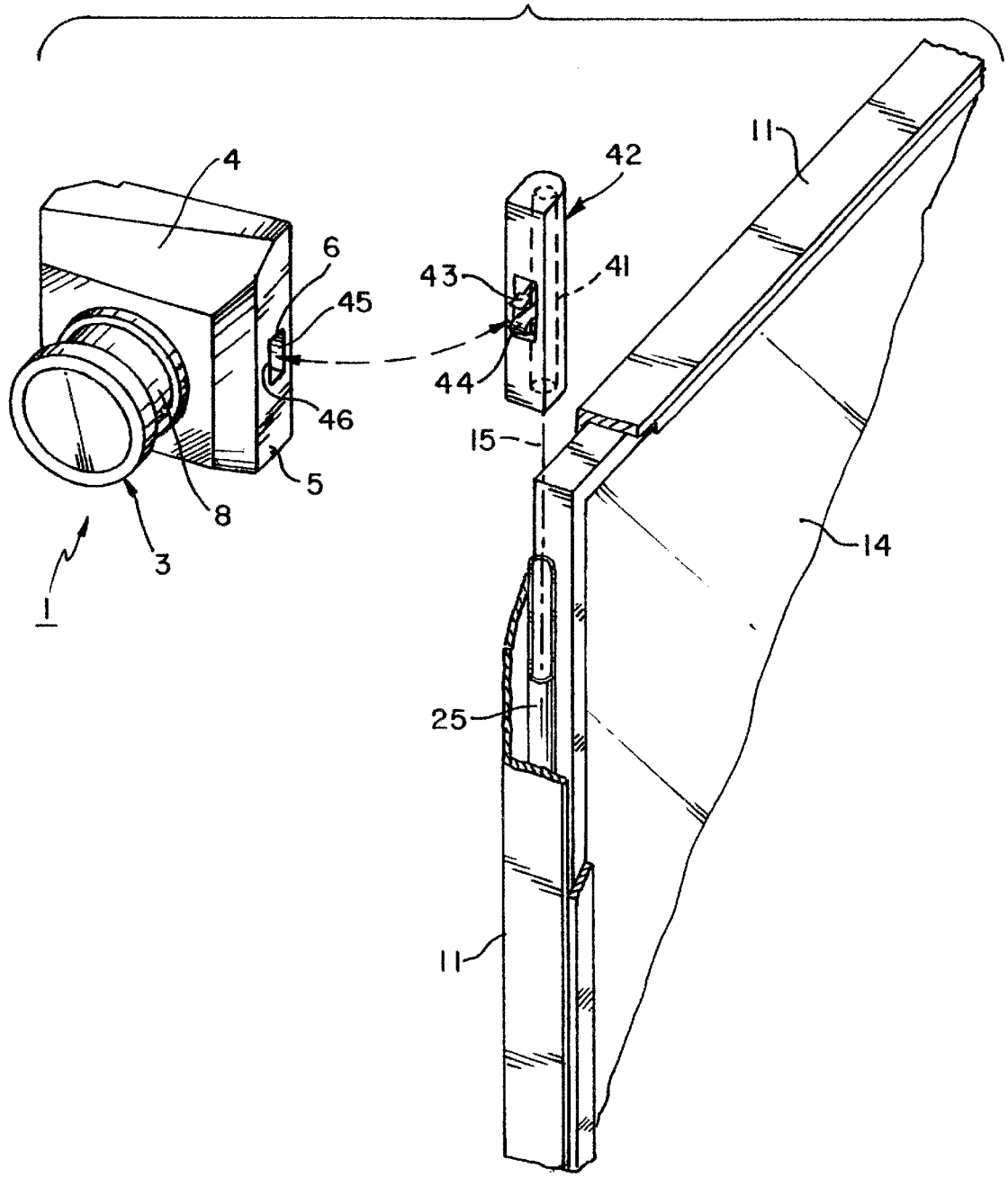

VIDEO CAMERA INTEGRATION ON A PORTABLE COMPUTER

FIELD OF INVENTION

The invention relates to incorporating a video camera as an integrated feature of a portable computer, and in particular to the structural considerations in integrating a video camera for use and storage in a portable computer.

BACKGROUND

Portable computers, sometimes referred to in the art using the terminology personal, laptop and notebook, have evolved in packaging into the use of a case in which in a base, a keyboard is positioned adjacent to the user, and on which, on a hinged cover, a display is positioned to be facing the user when the cover is open. The package or case is about the size of a notebook and weighs about five pounds. The portable computer is continually being provided with added features and is becoming a very flexible communication device. In some instances the portable computer package or case is adapted when manufactured to permit a later, to be added, feature. Such a situation is illustrated in U.S. Pat. No. 5,546,334 where the package is arranged at manufacture for the later addition of a cursor control device or track ball.

In general in adapting the portable computer package or case for an added feature, it is advantageous to arrange the elements involved in the feature so that the feature may store automatically and when stored protrudes beyond the basic package or case outside configuration as little as possible.

The addition of a video camera capability, is highly valuable as a portable computer added feature in imparting to the portable computer the ability to serve as an interactive communication device in such a situation as a video conference. The providing of such a feature however may require that the camera, for unobstructed view when in use, protrude beyond the portable computer package and if so the protrusion must be accommodated in storage. A serious problem with integrating a video camera in a portable computer is that while the most optimal place to mount the video camera would be at the location of least obstruction to the lens which in turn would be at the edge of the display portion of the package or case of the portable computer so that wide camera range and user eye contact may be made in video conferencing, the latest displays take up nearly all the space in the cover portion of the package so that there is very little room left for any mounting and camera movement mechanisms. As an illustration the 14.1 inch type diagonal display element is packaged with only about three or four millimeters of space between the edge of the display and a typical outside dimension of the cover portion of the display portion of the portable computer package.

SUMMARY OF THE INVENTION

In adding a video camera capability feature for a portable computer, an ability is provided for the packaging and mounting of the optical elements of a video camera in an assembly at the most extended portion of the periphery of the display portion of the portable computer package; with signal conduction to the processor in the base portion of the portable computer and with provision for storage of the video camera that protrudes in use, in the base portion of the portable computer with no protrusion, when the portable computer is not in use.

BRIEF DESCRIPTION OF THE DRAWINGS

FIGS. 4, 5 and 6 are closeup and exploded isometric views of the integrated video camera of the invention as positioned on the display portion of a portable computer package or case with the display bezel removed exposing the mechanism for retaining and positioning the video camera.

DESCRIPTION OF THE INVENTION

In the art of video cameras, a capability has become available that permits the overall camera structure to be integrated with a portable computer. The lens and the pixel conversion electronics has been downsized to the general size of about a half inch diameter with an integrated circuit chip no larger than the lens. The capability provides a camera that will occupy a physical volume of about 25 by 25 by 25 millimeters at the lens assembly location with a weight of about 30 grams. One such camera in the art is available from VSLI Vision Ltd., Edinburgh, U.K. That camera is built with a lens and a single integrated circuit. In accordance with the invention such a video camera can be integrated into a portable computer by providing cabling to place electronic signal processing in the processor in the base of the portable computer and providing moveable physical support for the camera that is compatible with the standard portable computer package. In the integration of the video camera the signals from the optical pixel conversion portion of the camera interfaces are communicated by cabling to the data processor located in the base of the portable computer. The processing is usually done in a video capture card, a parallel port or, more recently in portable computer construction, the Universal Serial Bus (USB) port.

In general it is desirable to have an integrated video camera for greater portability and ease of use for the reason that a user will find it inconvenient to have separate peripheral items that have to be carried and then need to be assembled to the computer package before they can be used. It is further advantageous; to have as little interaction on the user's part as possible when deploying or closing the computer package. The ability to easily position the video camera for aiming it at the desired scene to be captured is useful and, since not every use of a portable computer would involve a video camera, it is also useful to be able to provide a video camera mounting structure so that it is easy to remove or add the video camera to the portable computer package.

Figure 1:
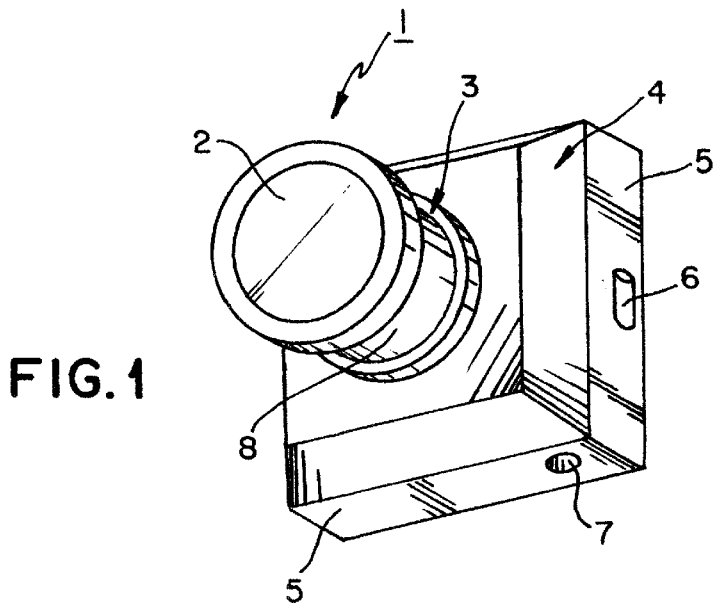
FIG. 1 is a perspective view illustrating the principles involved in the assembly of an integratable video camera in accordance with the invention.

In FIG. 1 a perspective view is provided of the principles involved in an assembly 1 to be used in mounting a video camera on a portable computer package in accordance with the invention. The overall package is light in weight. The assembly 1 will be mounted on the moveable cover with an arrangement so that the video camera enters a location in the base when the cover is closed. In FIG. 1 a video camera lens 2 is positioned, exposed, at one end of a lens mount 3, shown as cylindrical and also containing the pixel electronic conversion unit not shown. The mount 3 enters the top surface of and is supported by a base member 4 that has side surfaces 5 with an opening 6 in one of the surfaces for retention of the assembly 1 to other parts of the portable computer package and a further opening such as a hole 7 through which electronic connections may be made. The narrow portion 8 of the mount 3 is used in centering the assembly 1 into a physically close opening in the base of the portable computer package. The pixel conversion unit is located behind the lens 2 in the mount 3 or in the base member 4, obscured from view in FIG. 1.

In FIGS. 2 through 6 wherein like reference numerals are used for like objects the parts are illustrated in achieving the principles of one embodiment of the invention.

Figure 2:
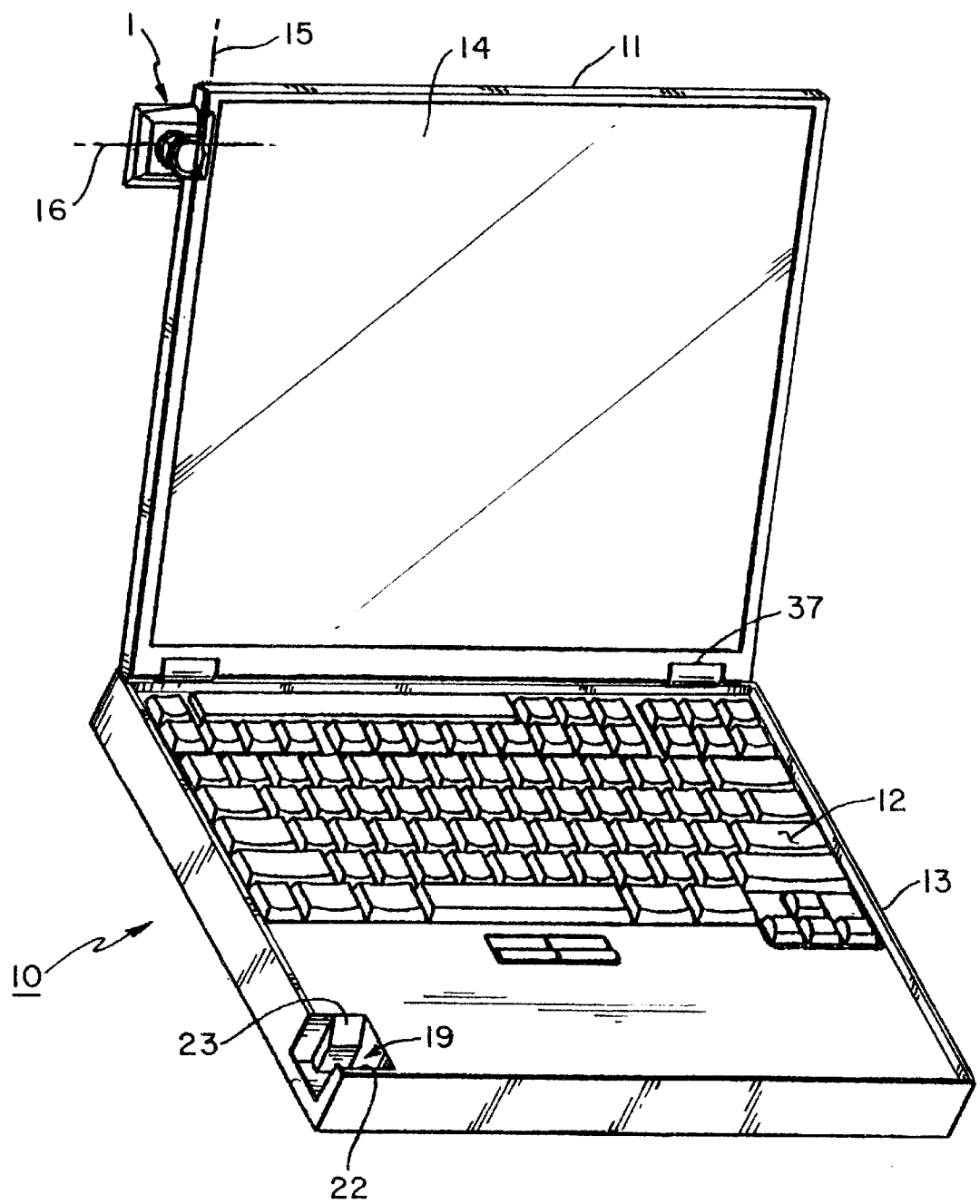
FIG. 2 is a perspective view of the integrated video camera of the invention attached to the side periphery of the display portion of a portable computer.

Referring to FIG. 2, the portable computer package 10 is shown in the position with the cover 11 open, exposing the keyboard 12 in the base 13, with the video camera assembly 1 mounted on the cover 11 near the most extended portion of the periphery of the display 14. After opening the cover 11 to the position illustrated in FIG. 2, the user would manually aim the assembly 1 in the direction of the desired scene, which in a video conferencing application would normally beat the user's face when at the keyboard, by rotating the assembly 1 about the azimuth 15 and elevation 16 pivot axes to be further discussed in connection with FIGS. 4 to 6. The cavity 19 is to accommodate in storage the rotated video camera assembly 1, with the beveled elements 22 and 23, engaging portion 8 of assembly 1.

Figure 3:
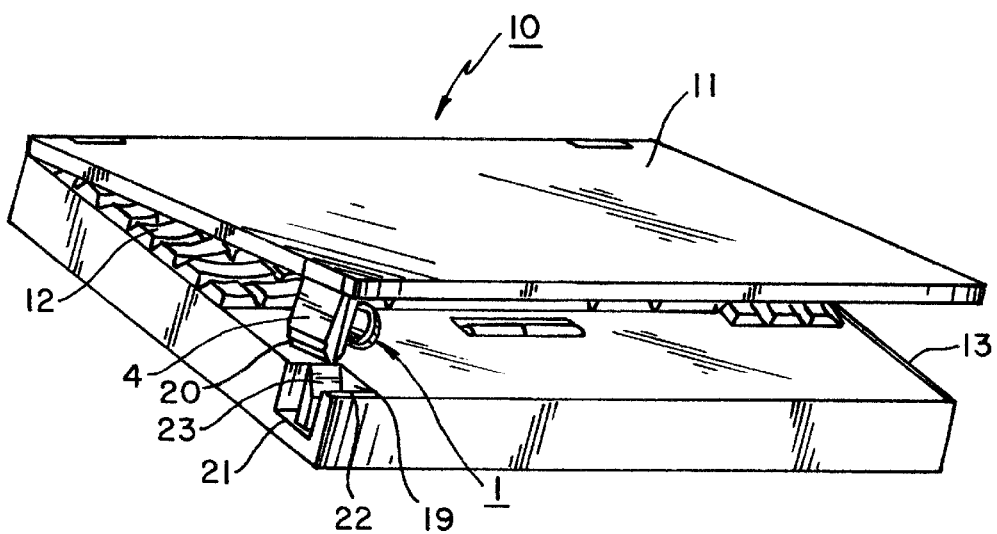
FIG. 3 is a perspective view of the integrated video camera of the invention when the portable computer package or case is in the nearly closed position.

In FIG. 3 there is shown the portable computer package 10 with the cover 11 in the nearly closed position and the camera assembly 1 about to enter a cavity 19 in the base 13 in which it will be retained when the portable computer package 10 is closed and being transported. To insure that the camera assembly 1 rotates to the proper position when the cover 11 is in the fully closed position on base 13, an angled edge 20 of one side 5 of the base 4, out of sight in FIG. 1, is formed to engage edge 21 of cavity 19 just before the cover 11 comes to the closed position. If the camera assembly 1 has not completely rotated to the proper position, a camming action is provided in which angled edge 20 on edge 21 operates to rotate the camera assembly 1 to the final stored position. Further, as the camera assembly 1 enters the cavity 19 beveled elements 22 and 23 center the lens mount 3 thus minimizing the necessary size of cavity 19. In further discussion with FIGS. 4–6, it will be developed that the maximum elevation angle adjustment is only about plus or minus 12 degrees from the center or resting position, making the camming action of the bevel of elements 22 and 23 practical. Thus the shape of the parts of the video camera assembly are formed in such a way that when cover 11 is in the fully closed position, the stored video camera assembly 1 forms a smooth, regular outside surface with the base 13. In FIGS. 4, 5, and 6 more detailed illustrations are provided of the cabling, the electronic conductors and the automatic rotating mechanism.

Referring to FIGS. 4 and 5, in which in FIG. 4 there is illustrated the left portion of the display 14 with a display bezel removed that surrounds the display 14 and covers the channel between the display 14 and the cover 11. The video camera assembly 1 is mounted on a hollow rod 25 which is rotationally mounted in the channel between the edge of the display 14 and the edge of the cover 11 by means of clips 26 and 27. An aperture 28 in hollow rod 25 allows electronic cable 29 which supplies electronic communication between the video camera in the assembly 1 and the electronics in the base 13 to pass around the pin 30 and enter the base next to the hinge 31. The lower end 32 of hollow rod 25 is attached to a well known in the art flexible shaft 33 of the type manufactured, for example, by S. S. White Industrial Products of Piscataway, N.J., USA. Flexible shaft 33 bends the 90 degrees around the corner of the display 14 and has the remaining end attached to a tab 34. Tab 34 is rotationally mounted by means of bracket 35 that in turn can be mounted to either the base 13 as shown or to cover 11 holding the display 14. The rotational axis of tab 34 which is illustrated as number 36 is coincidental with the rotational axis of the hinges that attach the cover 11 to the base 13 one of which 37 is visible in these FIGS. 4 & 5. Referring next to FIG. 5 which is a larger scale view of the lower left corner of the cover 11 supporting the display 14 where the relative motion can be more clearly seen.

When the cover 11 supporting the display 14 is rotated beyond 90 degrees with respect to the essentially horizontal keyboard 12 when the portable computer 10 is open for use as is the case in FIGS. 2, 4 and 5; the tab 34 and the items attached to it, i e, the flexible shaft 33, which in turn is attached to the hollow rod 25 and video camera assembly 1 rotate along axis 36 and thus there is no relative motion among items 1, 25, 33 and 34. When cover 11 with the display 14 is rotated to approximately 90 degrees or vertical with respect to the keyboard 12, tab 34 contacts stop 38 on bracket 35. At this point with tab 34 in contact with stop 38, continued rotation in the direction of closing the cover, operates to rotate items 1, 25, 33 and 34 thus causing the video camera assembly 1 to rotate approximately 90 degrees or nearly to the position that allows it to nest in cavity 19 when the cover 11 is closed. If the rotating mechanism falls short of rotating the video camera assembly 1 to the final position a correction is achieved with surface 20 contacting edge 21 as described in connection with FIGS. 2 and 3.

Referring now to FIG. 6, which is a blowup view near the top of the cover 11 supporting the display 14 where the camera assembly 1 is to be attached, at this location the hollow rod 25 is cut so that half the diameter is cut away forming a key 40 that engages a corresponding key receiving hole 41 in the bottom of camera assembly mounting bracket 42. Camera assembly mounting bracket 42 is made of a molded insulating material such as plastic and has molded into it two prong retainer members 43 and 44 that protrude into opening 6 and hook into the inside wall of the material of the base 4, other means of retention such as friction may also be used. This arrangement allows some manual elevation adjustment of the video camera assembly by the user. Opening 6 in the base 4 of the assembly 1 is round on top and bottom and has two flat sides 45 and 46. The two flat sides 45 and 46 restrict the rotational travel of the elevation adjustment to about 12 degrees. The hollow space between prongs 43 and 44 together with the shape of opening 6 allows electronic cable 29 visible in FIGS. 4 and 5 but not visible in this Figure, to be threaded through hollow rod 25, through opening 6 and into the video camera assembly 1.

If the user adjusts the viewing angle of the cover 11 supporting the display 14, while it is in the open position i.e., beyond 90 degrees to the base 13 supporting the keyboard 12, the video camera assembly 1 does not move relative to the display 14. If however, the user closes the cover 11 and display 14 by rotating it on it's hinges towards the keyboard 12, the mechanism involving parts 25, 28, 33 and 34 automatically rotates the video camera assembly 1 about the azimuth axis 15 to allow the video camera assembly 1 to nest into cavity 19.

In actual use, the user opens the portable computer 10 by lifting the cover 11 containing the display 14 to a position beyond vertical or beyond 90 degrees to keyboard 12. The video camera assembly 1 will remain in the same azimuth and elevation position as illustrated in FIG. 3 when the cover 11 was closed after previous use. The user then manually adjusts the video camera assembly 1 to aim the camera lens 3 at the desired scene by rotating it about axes 15 and 16. When the portable computer 10 is to be placed in the closed and storage condition, the cover 11 with the display 14 is rotated on the hinges and into contact with the base 13. Concurrently the automatic rotation mechanism described in connection with FIGS. 4–6 moves the video camera assembly 1 into the proper position for nesting in cavity 19.

Figure 7:
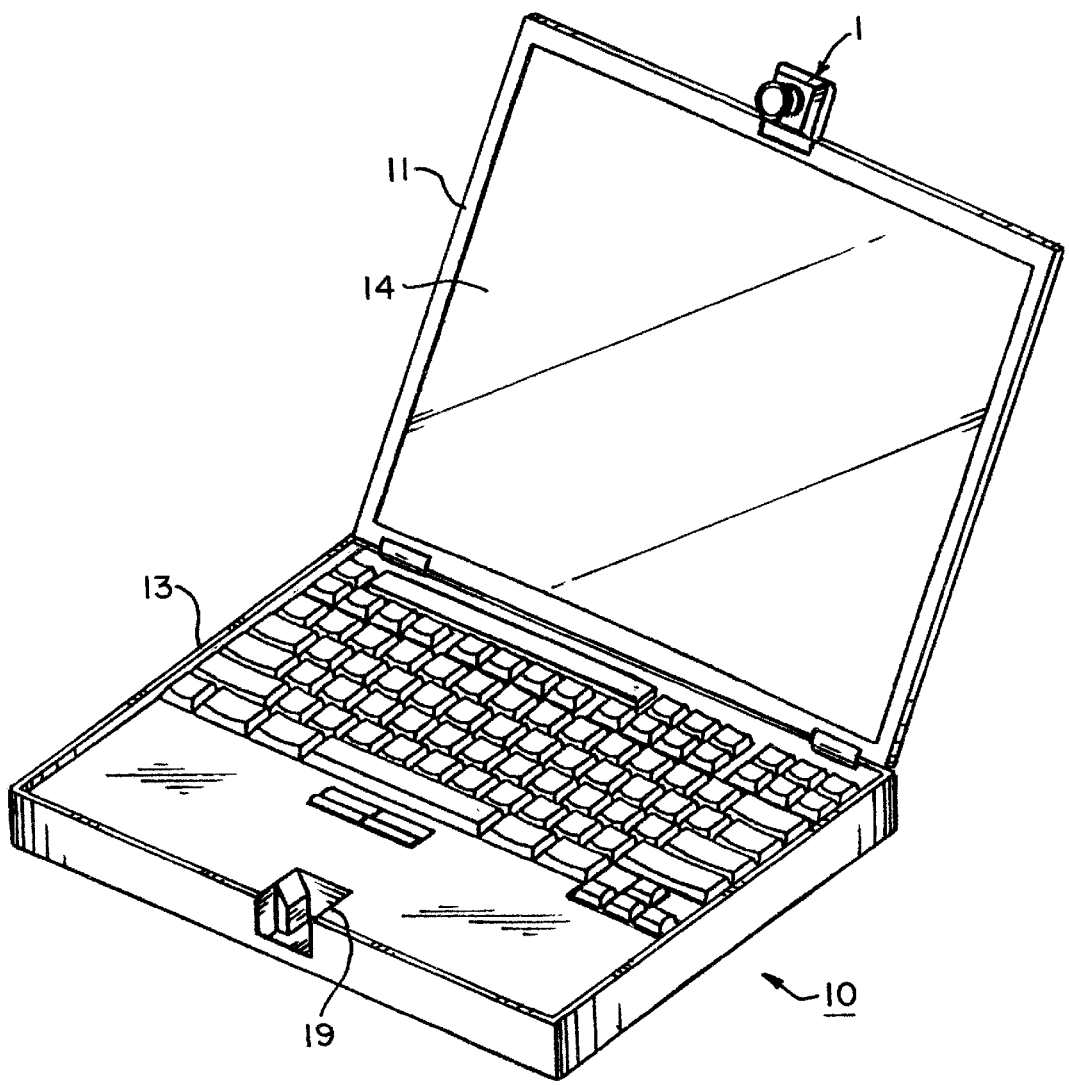
FIG. 7 is a perspective view of the portable computer package with the integrated video camera of the invention positioned in the vicinity of the peripheral center of the display portion of the portable computer package.

In accordance with the principles of the invention there will be further flexibility in implementation where the electronic cabling and the video camera assembly rotation mechanisms are located in the cover 11 in the channel between the cover 11 and the display 14. As one example, the automatic rotation mechanism described in connection with FIGS. 4–6 can be arranged in a mirror image and positioned in the channel between the cover 11 and the display 14 on the right side of the display 14. As a second example, the ability to position the video camera assembly 1 anywhere along either the side of display 14 can be extended to include the top of the cover 11 as is illustrated in connection with FIG. 7. Referring to FIG. 7 the video camera assembly 1 is shown centered on the top side of the cover 11 and the cavity 19 is located in the front of the keyboard 12 next to the user. In accordance with the principles of the invention as illustrated in connection with FIGS. 4–6, an additional flexible shaft similar to shaft 33 can be used in the upper left or right corner together with an additional hollow rod 25 that allows the video camera assembly 1 to be mounted on the top edge of the cover 11 with display 14 and that the extension gained with the additional flexible shaft and hollow rod will permit the automatic rotation mechanism to rotate the video camera assembly 1 the needed 90 degrees to seat in the cavity 19 when the cover is closed into contact with the base 13.

Figure 8:
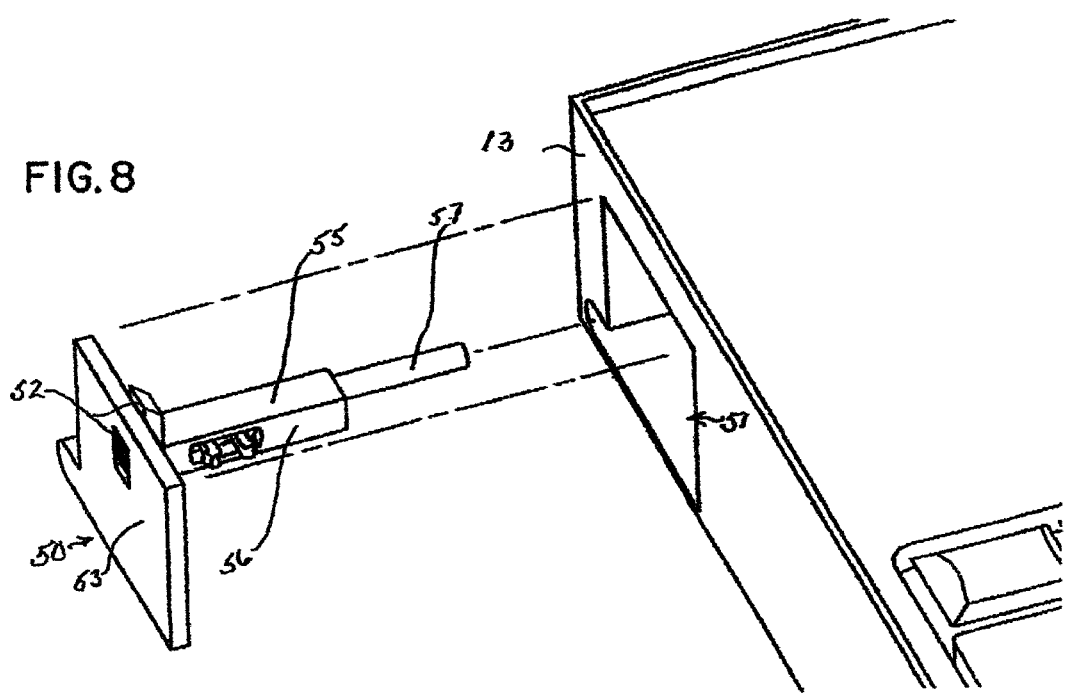
FIG. 8 is a view of a removable integrated video camera storage retainer for storage of a manually positionable embodiment of the integrated video camera of the invention in the base portion of the portable computer package.
Figure 10:
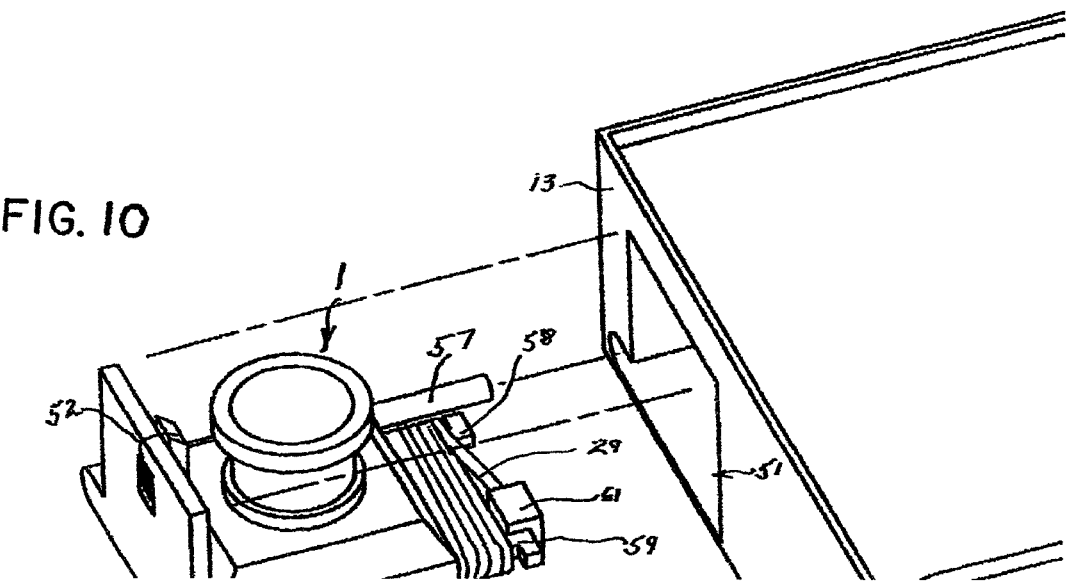
FIG. 10 is a view of the embodiment of FIG. 9 being stored in the base portion of the portable computer package.
Figure 9:
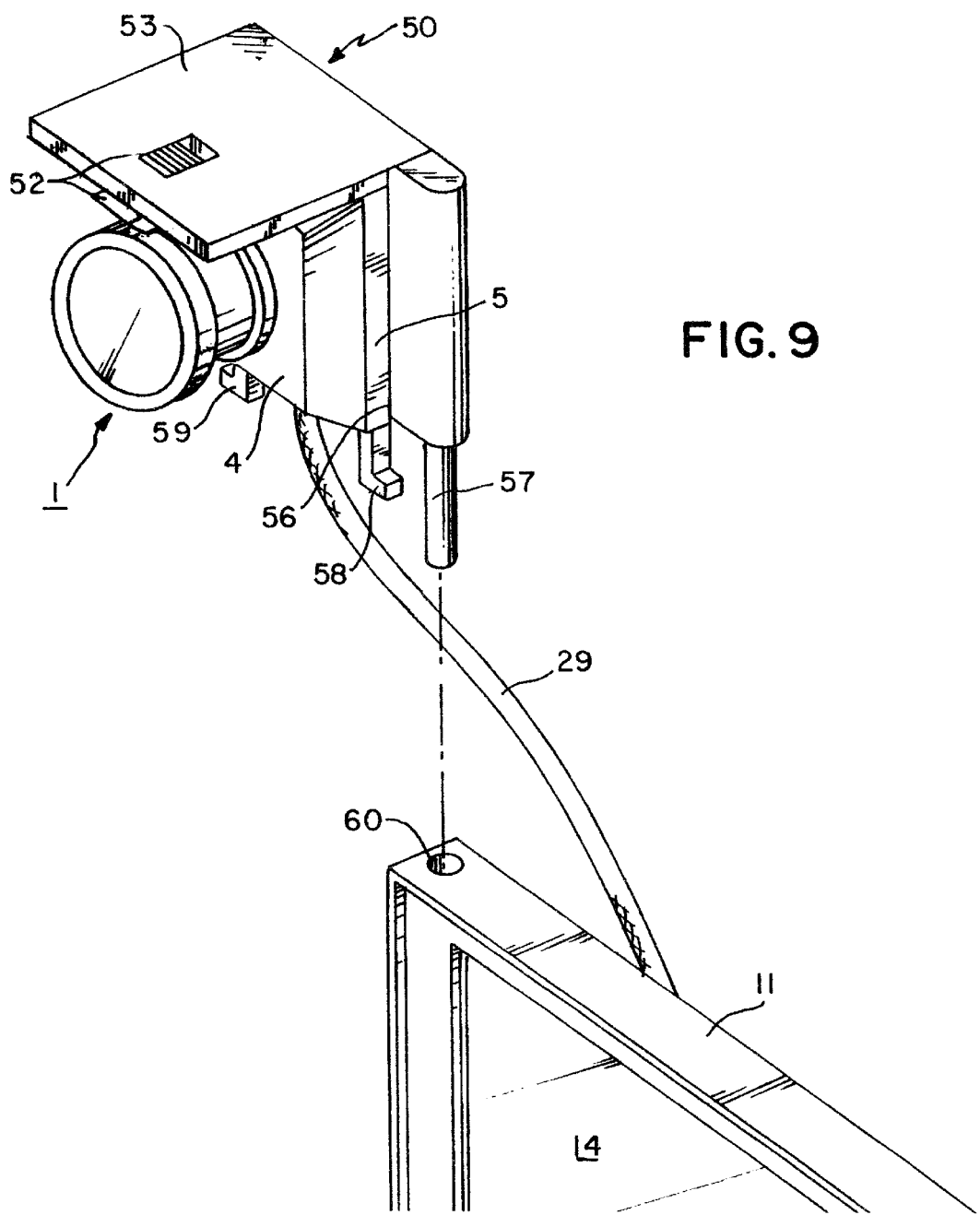
FIG. 9 is an expanded view of the manually positionable embodiment of the integrated video camera of the invention mounted on the display portion of the portable computer package.

In the integration of the video camera capability on a portable computer there may be instances where a channel is not available between the cover and the display such as would be the situation where the display was the full size of the inside of the cover and there may be a situation where the view direction would be away from the user such as would occur where the user were using. the computer in communication of events in a remote scene to be viewed through the camera. In accordance with the invention, the video camera assembly is in such instances mounted on a retainer that supports the camera both in use and for manual storage in the base of the portable computer as illustrated in connection with FIGS. 8, 9 and 10. In FIG. 8 there is schematically illustrated in an exploded view the features of the retainer. In FIG. 9 a perspective view is shown of the video camera assembly 1 on the retainer for positioning on the top side of the open cover 11 of the portable computer. In FIG. 10 an exploded view is shown of the retainer with the video camera assembly being inserted into the base 13 for storage.

In FIG. 8 in an exploded view there is schematically illustrated a retainer element 50 entering a storage opening 51 in the portable computer base 13. The retainer element 50 has a latch 52 that when the retainer 50, with the video camera assembly 1 that is to be attached, is positioned in the base 13 the face 53 of the retainer element 50 will be flush with the surface of the base 13. The retainer element 50 also has a support portion 55 on which the video camera assembly 1 is to be positioned in a similar fashion to the arrangement of FIG. 6. The support portion 55 also has a rotatable mounting pin 57 and a video camera mounting face 56.

Referring to FIG. 9, together with FIG. 1 of which FIG. 9 is an exploded view of the video camera assembly 1 being manually mounted on the periphery of the cover 11. The details of the video camera assembly are illustrated in FIG. 1. In FIG. 1 the video camera assembly 1 has the base 4 on a face 5 thereof fastened by clips that extend from face 56 into and grip the edges of opening 6 as is illustrated in FIG. 6. The cabling wiring 29 comes out of another opening such as hole 7, not fully visible in FIG. 9 but all visible in FIGS. 1 and 9. The cabling 29 enters the base 13 by manually plugging it into a connector not shown on base 13. Cable holders 57 and 58 are provided as inserts into a face 5 of base 4 for retention of the cabling 29 during storage.

The video camera assembly 1 is positioned on the portion 55 with a face 5 of the base 4 in contact with the face 56. The rotatable retention pin 57 is inserted into hole 60 in the cover 11 which may be positioned to accommodate the pin 57 behind the display 14.

For mounting, the user inserts rotatable retention pin 57 in hole 60 and manually plugs a connector 61, not shown, at the end of cable 29 into a socket in the processor in the base 13. Using the rotational capability of the pin 57 in hole 60 around axis 15 of FIG. 2, the user can manually adjust the azimuth angle of the video camera. The elevation of the camera around axis 16 of FIG. 2 is adjusted through the clearance of the retention clips in the opening 6 at interface 56 in a similar manner to that described concerning clips 43 and 44 in FIG. 6. For storage the user would unplug the cable connector not shown. The video camera assembly is then removed from the cover 11 by lifting the video camera assembly 1 until rotational pin 57 comes out of hole 60. At this point the cabling 29 may be wound around cable holders 58 and 59.

Referring to FIG. 10, an exploded view is provided of the video camera assembly 1 being inserted into the base 13 through opening 51. Latch 52 holds the retainer with the video camera assembly 1 in place with the cabling 29 and connector 61 secured within the space within the base 13 so that surface 53 will when latched form a smooth, regular outside base 13 surface.

In this manual storage embodiment, the video camera assembly 1 may be easily removed from the portable computer for the purpose of repairing, replacing or upgrading the camera.

If the portable computer were to be offered for sale without a video camera assembly, the retainer 50 could be merely a blank panel.

What has been described is the technology involved in providing a video camera feature for a portable computer in a standard package or case.

What is claimed is:

1. A portable computer of the type that is within a package including a computer base portion supporting a keyboard and a cover portion supporting a display, where said cover portion is attached by at least one hinge to said computer base, having an integrated a video camera capability, comprising:

a video camera assembly,
  said video camera assembly having an optical conversion unit including at least a lens and pixel conversion circuitry,
    said optical conversion unit being positioned in a first end of a mount member having first and second ends with said lens exposed at said first end,
  said video camera assembly further having an approximately rectangular video camera base member having first and second essentially parallel top and bottom surfaces,
    said mount member being positioned with said second end in an opening in said top surface of said video camera base member,
    said video camera base member having a specific thickness between said top and bottom surfaces said specific thickness defining side faces of said video camera base member,
    said video camera base member having at least one opening in at least one of said side faces,
  mounting means for said video camera assembly positioned in the portion of said cover that is most extended when said cover is in the open position,
    said mounting means being adapted for movement of said video camera assembly around an azimuth axis for said movement,
  cabling means for communicating video camera signals from said optical conversion unit to a processor located in said computer base portion, and,
  video camera assembly storage means located in said computer base position.

2. The video camera capability of claim 1 including said storage means being adapted, when said video camera is in the storage position for producing no protrusion from the surface of said portable computer package.

3. The video camera capability of claim 1 wherein said storage means positions said video camera for storage in said base portion of said portable computer in response to movement of said cover portion of said portable computer.

4. The video camera capability of claim 1 wherein said storage means includes a retainer member for use in manual rotational operational positioning of said video camera and for manual storage in said base portion of said portable computer.

5. The video camera capability of claim 4 wherein said video camera assembly is mounted on said retainer element that is stored in an opening in said base portion of said portable computer and is manually positioned on said most extended portion of said cover when said cover is in the open position.

6. The video camera capability of claim 5 wherein said retainer element has a mounting pin that is manually inserted into a hole in said most extended portion of said cover when said cover is in the open position.

7. The video camera capability of claim 6 including an electrical access to the processor of said portable computer.

8. The video camera capability of claim 1 wherein said video camera assembly is mounted on the periphery of said display portion of said portable computer and is automatically rotated into position for storage in a self aligning cavity in said base portion as said cover is closed.

9. The video camera capability of claim 8 wherein said automatic positioning of said video camera assembly as said cover is opened and closed involves a flexible cable located in said cover at the edge of said display.

10. The video camera capability of claim 9 wherein in said automatic positioning of said video camera assembly as said cover is opened and closed involves a flexible cable rotation located in said cover at the edge of said display, said flexible cable rotation being actuated by a tab member positioned in one of said at least one hinges.

11. The video camera capability of claim 10 wherein said flexible cable rotation rotates the position of said video camera assembly around an azimuth axis.

12. The video camera capability of claim 8 wherein said cavity located in said base portion of said portable computer, is adapted to receive and guide said mount as said cover is closed.

13. The video camera capability of claim 12 wherein said cavity has tapered portions for centering portions of said video camera assembly as said video camera assembly enters said cavity as said cover is closed.

14. The video camera capability of claim 13 wherein said tapered portions in said cavity serve a camming function in positioning said video camera assembly as said video camera assembly enters said cavity as said cover is closed.

* * * * *